US011269370B2

(12) United States Patent
Lawniczak et al.

(10) Patent No.: US 11,269,370 B2
(45) Date of Patent: Mar. 8, 2022

(54) DEVICE FOR CONTROLLING THE FLIGHT OF AN AIRCRAFT

(71) Applicant: SAFRAN ELECTRONICS & DEFENSE, Paris (FR)

(72) Inventors: Rémi-Louis Lawniczak, Paris (FR); Louis Julien, Paris (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/278,029

(22) PCT Filed: Sep. 20, 2019

(86) PCT No.: PCT/EP2019/075381
§ 371 (c)(1),
(2) Date: Mar. 19, 2021

(87) PCT Pub. No.: WO2020/064562
PCT Pub. Date: Apr. 2, 2020

(65) Prior Publication Data
US 2021/0271286 A1    Sep. 2, 2021

(30) Foreign Application Priority Data

Sep. 26, 2018 (FR) ..................................... 18 58806

(51) Int. Cl.
*B64C 13/04* (2006.01)
*G05G 9/02* (2006.01)
(Continued)

(52) U.S. Cl.
CPC ..... *G05G 9/04792* (2013.01); *B64C 13/0421* (2018.01); *G05G 5/03* (2013.01);
(Continued)

(58) Field of Classification Search
CPC ................. G05G 5/03; G05G 9/04792; G05G 2009/04718; G05G 2009/04766;
(Continued)

(56) References Cited

U.S. PATENT DOCUMENTS 3,295,386 A * 1/1967 Menefee ................. B64C 13/30
74/471 R
3,409,252 A * 11/1968 Miller ................. B64C 13/0421
244/237

(Continued)

FOREIGN PATENT DOCUMENTS

| EP | 0565757 A1 | 10/1993 | |
| FR | 3011815 A1 | 4/2015 | |
| WO | WO-2020048757 A1 * | 3/2020 | ........... B64C 13/042 |

OTHER PUBLICATIONS

International Search Report PCT/ISA/210 dated Nov. 29, 2019 in corresponding PCT Application PCT/EP2019/075381, with English translation, 4 pages.

(Continued)

*Primary Examiner* — Adam D Rogers
(74) *Attorney, Agent, or Firm* — Muncy, Geissler, Olds & Lowe, P.C.

(57) ABSTRACT

The invention provides a device comprising a control lever associated with a body carrying a first plate connected to the body, a second plate connected to the first plate with the control lever being connected to the second plate, a first transmission shaft pivotally mounted relative to the body, a first connection mechanism connecting the control lever to the first transmission shaft in such a manner that pivoting of the control lever about the first axis causes the first shaft to pivot about the fourth axis, a second transmission shaft pivotally mounted relative to the body, a second connection mechanism connecting the control lever to the second transmission shaft in such a manner that pivoting of the control (Continued)

lever about the second axis causes the second shaft to pivot about the sixth axis, and a platform connected to the body, the second connection mechanism being pivotally mounted on the platform and being pivotally mounted on the control lever.

10 Claims, 5 Drawing Sheets

(51) Int. Cl.
*G05G 9/047* (2006.01)
*G05G 5/03* (2008.04)

(52) U.S. Cl.
CPC .............. *G05G 2009/04718* (2013.01); *G05G 2009/04766* (2013.01); *G05G 2505/00* (2013.01)

(58) Field of Classification Search
CPC .. G05G 2505/00; B64C 13/04; B64C 13/042; B64C 13/0421
See application file for complete search history.

(56) References Cited

U.S. PATENT DOCUMENTS

| | | | | |
|---|---|---|---|---|
| 5,125,602 | A * | 6/1992 | Vauvelle | B64C 13/12 244/223 |
| 5,142,931 | A * | 9/1992 | Menahem | G05G 9/047 244/234 |
| 8,473,121 | B2 * | 6/2013 | Raimbault | G05D 1/0816 701/3 |
| 9,977,457 | B2 * | 5/2018 | Gomolko | B64C 13/0421 |
| 2021/0197959 | A1 * | 7/2021 | Werquin | B64C 13/042 |

OTHER PUBLICATIONS

Written Opinion PCT/ISA/237 dated Nov. 29, 2019 in corresponding PCT Application PCT/EP2019/075381, with machine English translation, 9 pages.

\* cited by examiner

DEVICE FOR CONTROLLING THE FLIGHT OF AN AIRCRAFT

The invention relates to an aircraft flight control device.

TECHNOLOGICAL BACKGROUND OF THE INVENTION

Aircraft flight control devices usually comprise a control lever that is pivotally mounted on the body of the control device to pivot about at least two mutually perpendicular axes in order to be able to control the rolling and pitching movements of the aircraft. For this purpose, the control lever is mechanically or electrically connected to one or more aircraft control members such as control surfaces.

In order to assist the pilot in controlling the aircraft in rolling and pitching, flight control devices are known that include control motors associated with the lever so that for each pivoting movement of the lever relative to the body, one of the motors serves to simulate force feedback to the pilot moving the lever. The lever can thus be moved easily and without effort by the pilot, compared with devices in which control is performed via a direct mechanical connection between the lever and the control members.

Nevertheless, with such architecture, the force felt on the control lever when pivoting about the pitch axis generally differs depending on whether the control lever is also inclined to right or to the left about the roll axis.

In order to mitigate that coupling drawback, proposals have been made to servocontrol the control motors in order to make the force felt on the control lever when pivoting about the pitch axis symmetrical regardless of whether the control lever is also inclined about the roll axis.

Nevertheless, that makes it necessary to develop servocontrol that is particular and that limits the use that can be made of the motors involved. Also, the motors need to be over-sized in order to deliver such symmetrical force.

OBJECT OF THE INVENTION

An object of the invention is to provide a flight control device that enables the above-mentioned drawbacks to be obviated, at least in part.

BRIEF DESCRIPTION OF THE INVENTION

In order to achieve this aim, there is provided an aircraft flight control device comprising a control lever associated with a body carrying:
- a first plate connected to the body by a first pivot connection about a first axis;
- a second plate connected to the first plate by a second pivot connection about a second axis that is substantially perpendicular to the first axis and that intersects it, the control lever being connected to the second plate by a third pivot connection about a third axis that is substantially perpendicular to the first and second axes, and that intersects them;
- a first transmission shaft mounted to pivot relative to the body about a fourth axis and connected to at least one first control motor member outside the body;
- a first connection mechanism connecting the control lever to the first transmission shaft in such a manner that pivoting of the control lever about the first axis causes the first shaft to pivot about the fourth axis, the first shaft and the first connection mechanism being connected to each other by a fifth pivot connection about a fifth pivot axis that is inclined relative to the first axis and to the fourth axis;
- a second transmission shaft mounted to pivot relative to the body about a sixth axis and connected to at least one second control motor member outside the body;
- a second connection mechanism connecting the control lever to the second transmission shaft in such a manner that pivoting of the control lever about the second axis causes the second shaft to pivot about the sixth axis, the second shaft and the second connection mechanism being connected to each other by a seventh pivot connection about a seventh axis that is inclined relative to the second axis and to the sixth axis; and
- a platform connected to the body by an eighth pivot connection about an eighth axis, the second connection mechanism being pivotally mounted on the platform by a ninth pivot connection about the first axis and being pivotally mounted on the control lever by a tenth pivot connection about the first axis.

By having such a particular shape for the flight control device, the flight control device is found to provide control about the second axis and the sixth axis that is fully decoupled from control about the first axis and the fourth axis. Furthermore, control is found to be symmetrical both about the first axis and about the second axis.

With such architecture, the force felt from the control lever when pivoting about the second axis is thus naturally substantially unchanged regardless of whether the control lever is also inclined to right or to left about the roll axis.

This makes it possible to omit installing particular servo-control in order to make the force feedback felt on the control lever symmetrical. The invention naturally enables the force feedback felt on the control lever to be decoupled and symmetrical.

With the invention, this also makes it easier to install an optional redundant emergency system that is passive and mechanical for creating force feedback felt on the control lever.

In the present application, an axis A is said to be "inclined" relative to an axis B when the axis A is neither parallel nor perpendicular to the axis B.

Optionally, when the control lever is in a neutral position, the sixth axis is substantially normal to the plane defined by the first axis and the second axis.

Optionally, when the control lever is in a neutral position, the fourth axis is substantially normal to a plane containing the first axis and the second axis.

Optionally, the first axis, the second axis, the third axis, the sixth axis, the seventh axis, and the eighth axis are substantially concurrent a first point, and the first axis, the fourth axis (A), and the fifth axis (C), are substantially concurrent at a second point.

Optionally, the fourth axis and the sixth axis (D) are substantially parallel.

Optionally, the first connection mechanism is arranged to connect the first shaft to the first plate by a Cardan joint.

Optionally, the second connection mechanism is arranged to connect the second shaft to the control lever by a Cardan joint.

Optionally, the second plate surrounds the first plate externally.

Optionally, both plates surround the platform externally.

Optionally, the device includes at least one abutment for limiting movement of the control lever about the first axis or about the second axis, the abutment being in the form of a rotary roller.

BRIEF DESCRIPTION OF THE DRAWINGS

The invention can be better understood in the light of the following description of a nonlimiting embodiment of the invention given with reference to the accompanying figures, in which.

DETAILED DESCRIPTION OF THE INVENTION

Figure 1:
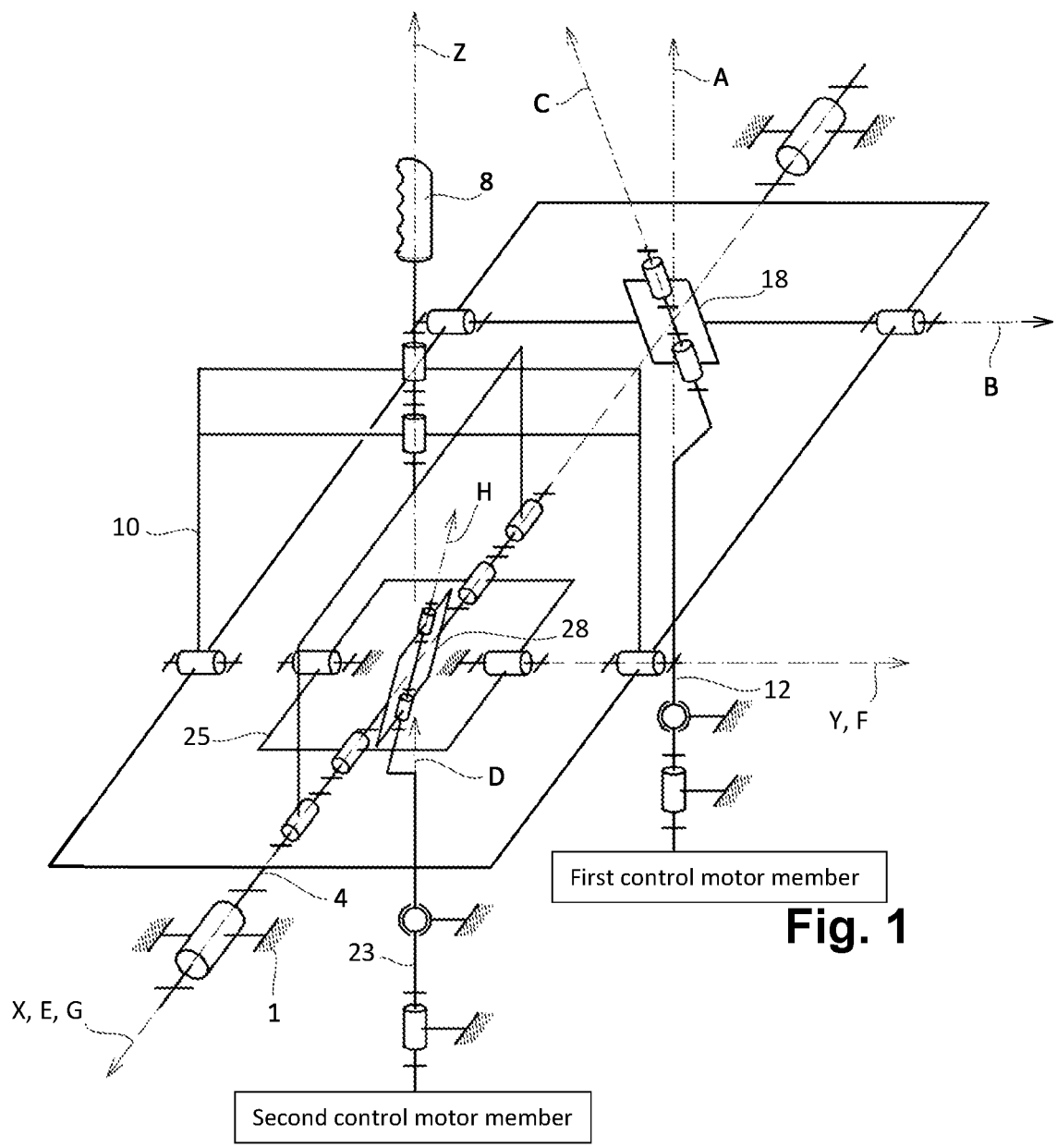
FIG. 1 is a diagram of a flight control device in a particular embodiment of the invention.
Figure 2:
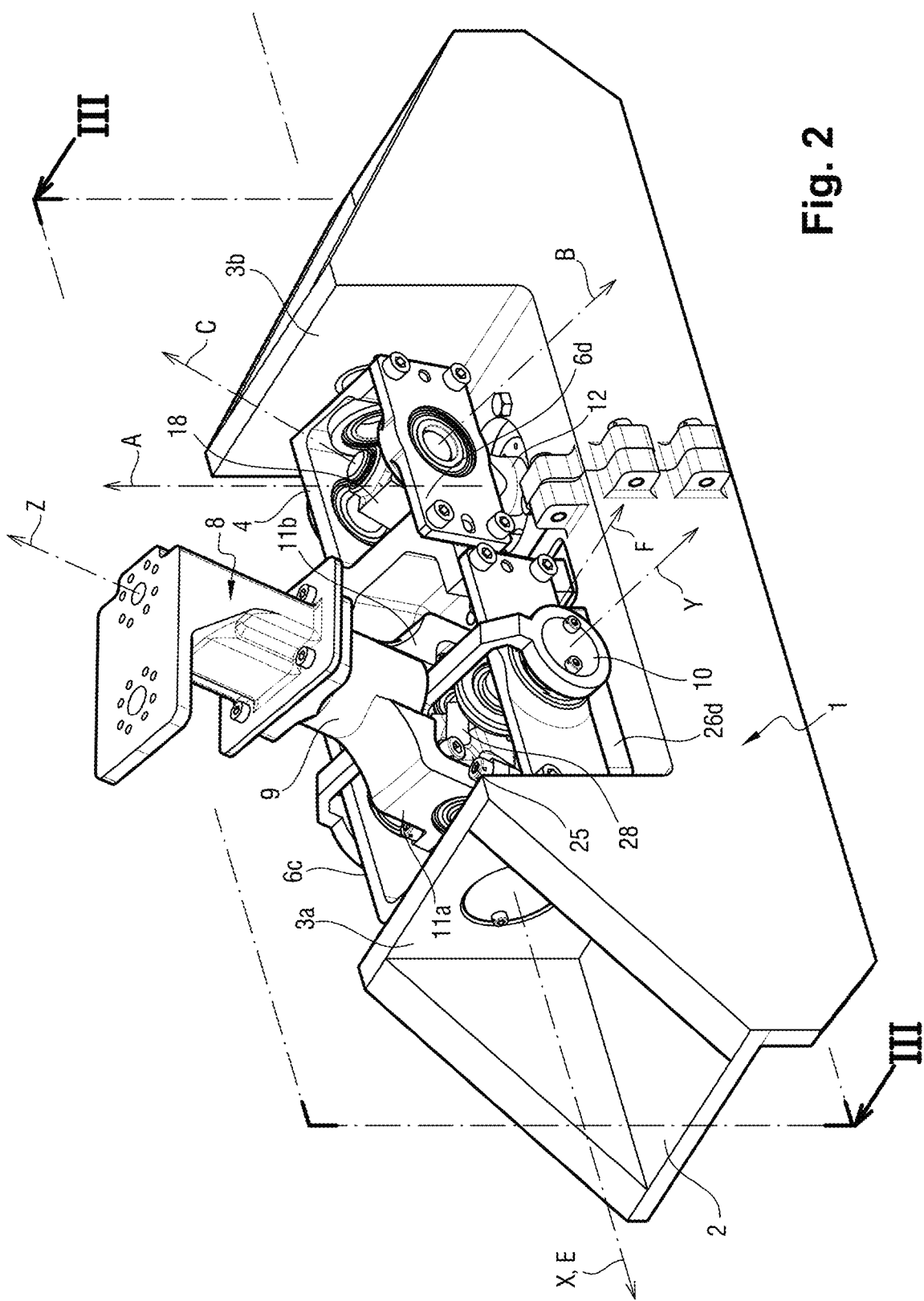
FIG. 2 is a perspective view of the device shown diagrammatically in FIG. 1.
Figure 3:
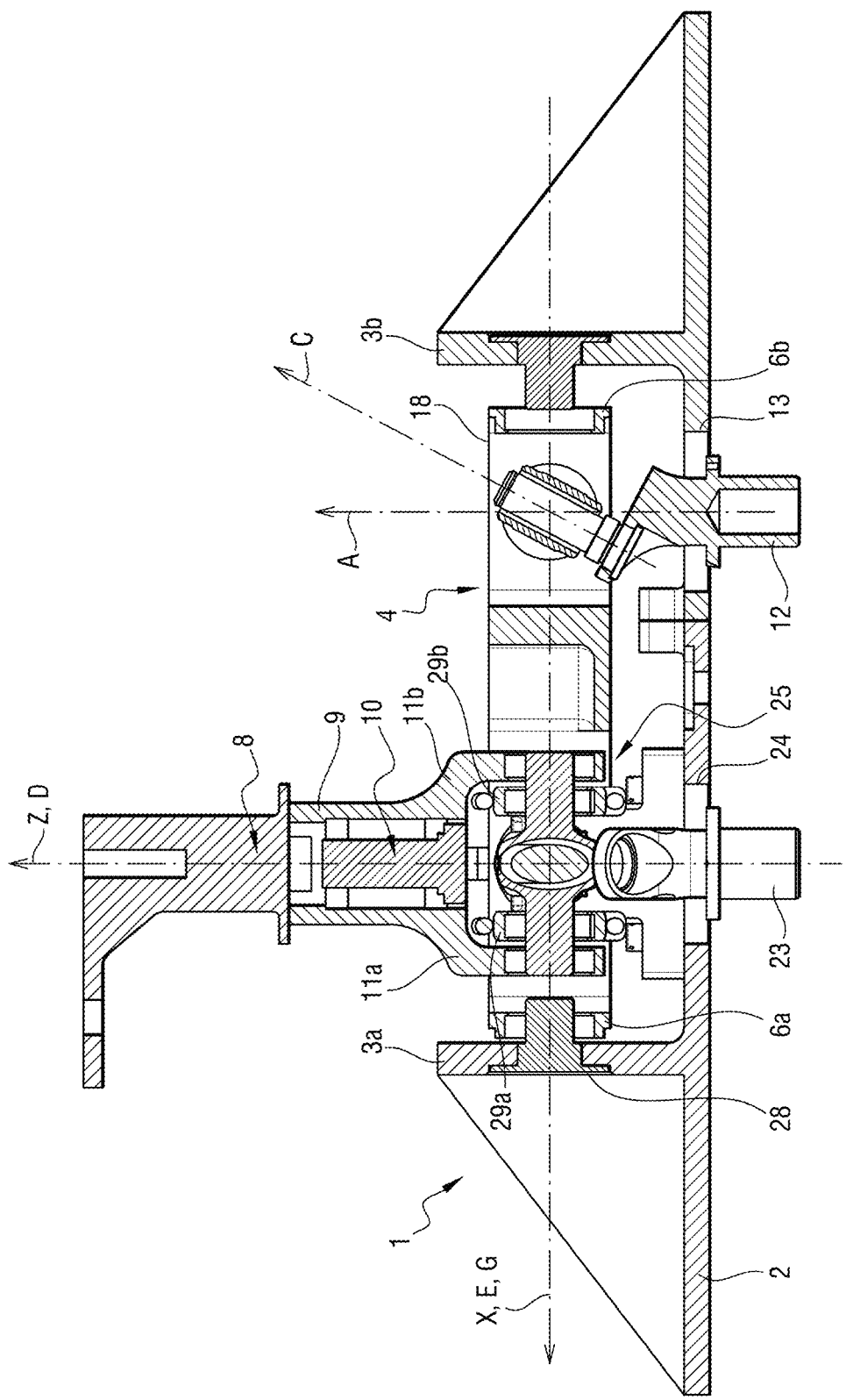
FIG. 3 is a longitudinal section view of the device shown diagrammatically in FIG. 1.
Figure 4:
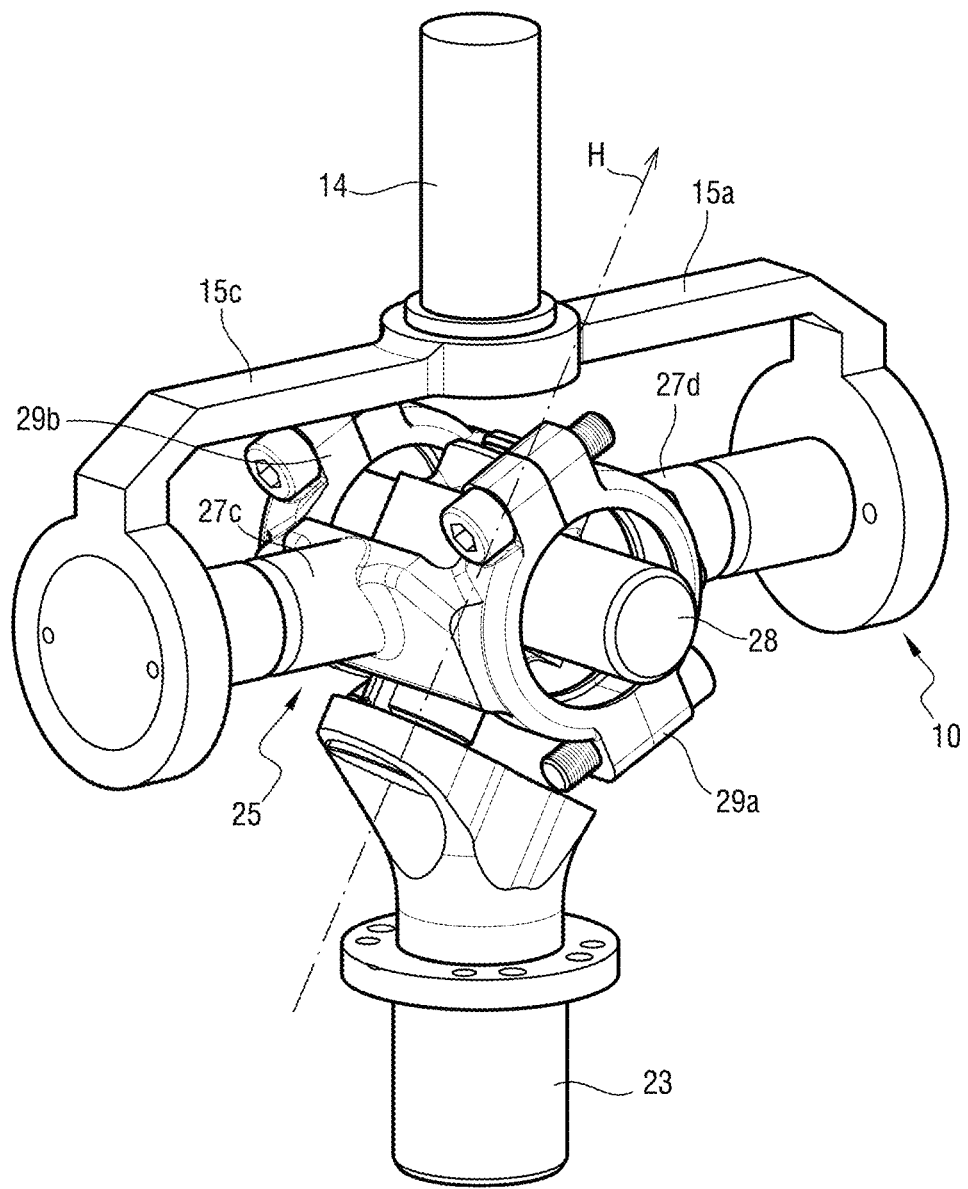
FIG. 4 is a perspective view of a portion of the device shown diagrammatically in FIG. 1, in particular with the control lever and the first plate of the device not being shown.

With reference to FIGS. 1 to 4, the flight control device in the first embodiment of the invention includes a body 1. In particular manner, the body 1 extends longitudinally and includes a floor 2 and at least two mutually opposite side walls 3a, 3b, both extending vertically relative to the floor 2.

The device also includes a first plate 4 that in this example is in the general shape of an elongate frame. The first plate 4 is directly connected to the body 1 by a first pivot connection about the first pivot axis X. The first axis X is associated with the roll axis of the aircraft.

For this purpose, the first plate 4 is mounted on the body 1 by two bearings (not shown) on the same axis that are mounted respectively on the two opposite side walls 3a and 3b of the body 1. The first plate 4 thus comprises two side walls 6a and 6b that are parallel to the side walls 3a and 3b of the body 1, and two longitudinal walls 6c and 6d that extend between the side walls 6a and 6b of the first plate 4.

The device also includes a control lever 8 that is associated with the body 1 and that, in this example, includes a stick forming a free end of the control lever. The control lever 8 is connected to the first plate 4 by a second plate 10 of a shape that can be seen in FIG. 4.

The second plate 10 is connected directly to the first plate 4 by a second pivot connection about a second pivot axis Y, where the second axis Y is perpendicular to the first axis X and intersects it. The second axis Y is associated with the pitch axis of the aircraft.

For this purpose, the second plate 10 of the control lever 8 is mounted on the first plate 4 by two bearings (not shown) on the same axis that are mounted respectively on the opposite longitudinal walls 6c and 6d of the first plate 4. It should be observed that the second axis Y is connected to the first plate 4, i.e. pivoting the first plate 4 about the first axis X causes the second axis Y to pivot about the first axis X.

In this example, the second plate 10 is shaped so as to be pivotally mounted on the first plate 4 outside the first plate 4. Thus, the second plate 10 is mounted on the first plate 4 via the outer faces of the opposite longitudinal walls 6c and 6d of the first plate 4. Typically, the second plate 10 includes a connection base 14 for connecting to the control lever 8, the base having two branches 15c and 15d projecting therefrom, with each of them being mounted on a respective one of the longitudinal walls 6c, 6d of the first plate 4. The second plate 10 is thus generally of upside down U-shape.

The control lever 8 is also connected to the second plate 10 by a third pivot connection about a third pivot axis Z, the third axis Z being perpendicular to the first axis X and to the second axis Y, and intersecting them. For this purpose, the control lever 8 is mounted on the connection base 14 of the second plate 10 by two bearings on the same axis (not shown), which connection base 14 itself extends along the third axis Z.

It should be observed that the third axis Z is linked to the first plate 4, i.e. pivoting the first plate 4 about the first axis X (or about the second axis Y) causes the third axis Z to pivot about the first axis X (or about the second axis Y).

In this example, the control lever 8 is shaped in such a manner as to present a main portion 9 that extends along the third axis Z and that is pivotally mounted on the connection base 14. The distal end of the main portion 9 is extended by a clevis having two opposite flanks 11a and 11b. In this example, the flanks 11a and 11b of the clevis extend parallel to the side walls 3a and 3b of the body 1 when the control lever 8 is in its neutral position.

It should be observed that the two branches 15c and 15d of the second plate 10 pass under the main portion 9 between the two flanks 11a and 11b of the clevis in order to reach the first plate 4.

The device includes a first transmission shaft 12 that is directly connected to the body 1 by a fourth pivot connection about a fourth pivot axis A. For this purpose, the first transmission shaft 12 extends in part inside a hole 13 in the floor 2 of the body 1 and is pivotally mounted in the hole 13 by two bearings (not shown) on the same axis.

In this example, the first transmission shaft 12 is arranged in such a manner that the fourth axis A intersects the first axis X. In this example, the first transmission shaft 12 is also arranged in such a manner that the fourth axis A is normal to a plane containing the first axis X and the second axis Y when the control lever 8 is in a neutral position (i.e. when the plane containing the first axis X and the second axis Y is parallel to the floor 2). In this neutral position of the control lever 8, the fourth axis A is thus parallel to the third axis Z.

The first shaft 12 has a first end. The first end comprises a straight terminal portion and a bent connection portion connecting the straight terminal portion to the second end of the second shaft. The straight terminal portion of the first end thus extends obliquely relative to the fourth axis A and to the second end of the second transmission shaft.

The second end of the first shaft 12 is connected to a first group of motors (not shown), which group is outside the body.

The device also includes a first connection mechanism connecting the control lever 8 to the first transmission shaft in such a manner that pivoting the control lever 8 about the first axis X causes the first transmission shaft 12 to pivot about the fourth axis A.

Preferably, the first connection mechanism connects the first transmission shaft 12 to the control lever 8 via a Cardan joint.

In this example, the first connection mechanism thus includes a first spider 18 comprising two crossed branches that extend perpendicularly relative to each other.

In particular manner, the first connection mechanism is connected directly to the first plate 4 by a fifth pivot connection about a fifth pivot axis B. For this purpose, a first end of the first branch of the first spider 18 is mounted on one of the longitudinal walls 6d of the first plate 4 by a first bearing secured to said longitudinal wall 6d, and the second end of the first branch of the first spider 18 is mounted on the other longitudinal wall 6c of the first plate 4 by a second bearing secured to said longitudinal wall 6c, the first and second bearings being on the same axis. As a result, the first branch extends transversely in the first plate 4 between the two longitudinal walls 6c and 6d of the first plate 4.

The first spider 18 is arranged in such a manner that the fifth axis B coincides with the first axis X and with the fourth axis A, and it extends parallel to the second axis Y when the control lever 8 is in its neutral position.

In this example, the second branch of the first spider 18 is provided with a central bore extending along the entire length of the second branch. The first transmission shaft 12 is directly connected to the first spider 18 by a sixth pivot connection about a fifth pivot axis C. For this purpose, the straight terminal portion of the first transmission shaft 12 extends inside the second branch and is pivotally mounted in the central bore of the second branch by means of two bearings on the same axis.

The device is arranged in such a manner that the sixth axis C is inclined relative to the first axis X, to the fourth axis A, and to the fifth axis B, and intersects the first axis X, the fourth axis A, and the fifth axis B. In this example, the first transmission shaft 12 is shaped in such a manner that the straight terminal portion extends at 25° relative to the second end of the first transmission shaft 12, with the sixth axis C then extending in this example at 25° relative to the fourth axis A.

As a result of the particular bent shape of the first transmission shaft 12, it is thus possible to have a pivot connection between the first shaft 12 and the connection mechanism that has its axis inclined, in particular relative to the first axis X and to the fourth axis A.

Torque is thus transmitted between the first control lever 8 and the first transmission shaft 12 via the first plate 4 and the first spider 18. When the pilot moves the first control lever 8 about the first pivot axis X, the first plate 4 is also caused to pivot relative to the body 1 about the first pivot axis X, thereby acting via the Cardan joint created by the first spider 18 to cause the first transmission shaft 12 to pivot about the fourth axis A.

The device includes a second transmission shaft 23 directly connected to the body 1 by a seventh pivot connection about a seventh pivot axis D. For this purpose, the second transmission shaft 23 extends in part inside a hole 24 in the floor 2 of the body 1 and is pivotally mounted in the hole 24 by two bearings (not shown) on the same axis.

In this example, the second transmission shaft 23 is arranged in such a manner that the seventh axis D intersects the first axis X and the second axis Y. In this example, the second transmission shaft 23 is also arranged in such a manner that the seventh axis D is normal to a plane containing the first axis X and the second axis Y when the control lever 8 is in its neutral position (i.e. when the plane containing the first axis X and the second axis Y is parallel to the floor 2).

The seventh axis D is thus parallel to the fourth axis A in such a manner that the first transmission shaft 12 and the second transmission shaft 23 extend parallel to each other.

The second shaft 23 has a first end. The first end comprises a straight terminal portion and a bent connection portion connecting the straight terminal portion to the second end of the second shaft 23. The straight terminal portion of the first end thus extends obliquely relative to the seventh axis D and to the second end.

The second end of the second shaft 23 is connected to a second group of motors (not shown), which group is outside the body.

The device also includes a second connection mechanism connecting the control lever 8 to the second transmission shaft 23 in such a manner that pivoting the control lever 8 about the second axis Y causes the second transmission shaft 23 to pivot about the seventh axis D.

Preferably, the second connection mechanism connects the second transmission shaft 23 to the control lever 8 via a Cardan joint.

In this example, the second connection mechanism thus includes a second spider 28 comprising two crossed branches that extend perpendicularly relative to each other.

In particular manner, the second connection mechanism is connected directly to the control lever 8 by an eighth pivot connection about an eighth pivot axis E, which in this example coincides with the first pivot axis X. For this purpose, a first end of the first branch of the second spider 28 is mounted on one of the flanks 11a of the clevis of the control lever 8 by a first bearing (not shown) and the second end of the first branch of the second spider 28 is mounted on the other flank 11b of the clevis of the control lever 8 by a second bearing (not shown), the first and second bearings lying on the same axis. As a result, the first branch of the first spider 28 extends longitudinally in the body 1 between the flanks of the clevis of the control lever 8.

Furthermore, the second connection mechanism is connected to the body 1 by a platform 25 of the device. The platform 25 is connected directly to the body by a ninth pivot connection about a ninth pivot axis F. The ninth pivot axis F coincides with the second pivot axis Y when the control lever 8 is in its neutral position (i.e. when the plane containing the first axis X and the second axis Y is parallel to the floor 2).

For this purpose, the body 1 has two lateral flanges 26c and 26d (only one of which is referenced in the accompanying figures), each extending normally to the floor 2 of the body 1. In corresponding manner, the platform 25 includes two fingers 27c and 27d, a first finger 27c being pivotally mounted on one of the flanges 26c by a bearing (not shown), and a second finger 27d being pivotally mounted on the other flange 26d by a bearing (not shown), the first and second bearings being on the same axis.

As a result, the platform 25 extends transversely in the body 1 between the two flanges 26c and 26d.

In particular manner, the two flanges 26ac and 26d extend between the platform 25 and the first plate 4.

As a result of the positioning of said flanges, the platform 25 is thus surrounded externally by said flanges 26c and 26d and also firstly by the first plate 4, which itself surrounds the two flanges 26c and 26d externally, and secondly by the second plate 10, which itself surrounds the first plate 4 externally.

Furthermore, the second connection mechanism is connected directly to the platform 25 by a second pivot connection about a tenth pivot axis G, which in this example coincides with the first pivot axis X. For this purpose, a first end of the first branch of the second spider 28 is mounted on one of the side walls 29a of the platform 25 by a first bearing (not shown) and the second end of the first branch of the second spider 28 is mounted on the other side wall 29b of the platform 25 (opposite the side wall 29a) by a second bearing (not shown), the first and second bearings being on the same axis. As a result, the first branch of the first spider 28 extends longitudinally in the body 1 between the two side walls 29a and 29b of the platform 25.

As a result of the positioning of the platform 25, the first spider 28 is surrounded externally by said side walls 29a and 29b, and also firstly by the control lever 8, which itself surrounds the two side walls 29a and 29b of the platform 25 externally by means of its flanks 11a and 11b, and secondly by the first plate 4, which itself surrounds the control lever 8 externally.

In this example, the second branch of the second spider 28 is provided with a central bore extending along the entire length of the second branch. The second transmission shaft 23 is directly connected to the second spider 28 by an eleventh pivot connection about an eleventh pivot axis F. For this purpose, the bent first end of the second transmission shaft 23 extends inside the second branch and is pivotally mounted in the central bore of the second branch by means of two bearings lying on the same axis.

The device is arranged in such a manner that the eleventh axis H is inclined relative to the first axis X, to the second axis Y, and to the seventh axis D, and intersects the first axis X, the second axis Y, and the seventh axis D. In this example, the second transmission shaft 23 is shaped in such a manner that the bent first end extends at 25° relative to the second transmission shaft 23, the eleventh axis H then thus extending in this example at 25° relative to the seventh axis D.

As a result of the particular bent shape of the second transmission shaft 23, it is thus possible to have a pivot connection between the second shaft 23 and the second connection mechanism having its axis inclined in particular relative to the second axis Y and to the seventh axis D.

Torque is thus transmitted between the control lever 8 and the second transmission shaft 23 solely via the second spider 28. When the pilot moves of the control lever 8 to pivot about the second pivot axis Y, that acts via the Cardan joint created by the second spider 28 to cause the second transmission shaft 23 to pivot about the sixth axis D. Nevertheless, that does not cause the first pivot shaft 12 to pivot about the third axis A.

As a result of the configuration of the device, and in particular because the second transmission shaft 23 is carried by the platform 25, itself connected to the body 1, it can be observed that when the control lever 8 is moved by the pilot about the first pivot axis X, that leads to pivoting only of the first transmission shaft 12 about the fourth axis A. In particular, that does not lead to the second transmission shaft 23 pivoting about the second axis D.

The device as described thus enables pivoting movement of the control lever 8 about the first axis X to be decoupled completely from pivoting movement of the second transmission shaft 23 about the seventh axis D, and also enables pivoting movement of the control lever 8 about the second axis Y to be decoupled completely from pivoting movement of the first transmission shaft 12 about the fourth axis A.

This thus also ensures that the forces exerted on the two transmission shafts 12 and 23 are symmetrical.

It should be observed that the second plate 10 is associated with the roll control of the device and the platform 25 is associated with its pitch control. The second plate 10 for guiding rolling movement is thus arranged outside the platform 25 for guiding pitching movement.

Also, the device in the first embodiment of the invention has only eleven pivot connections and eight main elements (first transmission shaft 12, second transmission shaft 23, first spider 18, second spider 28, first plate 4, second plate 10, platform 25, and control lever 8) while enabling one motor groups to be associated with pivoting movements of the control lever 8 relative to the body 1 about the first axis X and the second axis Y. The device in this particular embodiment of the invention is thus indeed of simplified structure.

Also, the various elements of the device are connected to one another solely by means of bearings. This enables the device to be simplified and made more reliable. Specifically, there is no gearing that might seize, nor any belts that might break, nor any linear connections that are more sensitive to wear.

Preferably, the device is arranged in such a manner that the first axis X, the second axis Y, the third axis Z, the seventh axis D, the eighth axis E, the ninth axis F, the tenth axis G, and the eleventh axis H are all concurrent at a first point, and the first axis X, the fourth axis A, the fifth axis B, and the sixth axis C are all concurrent at a second point.

Thus, the various pivot axes of the device are concurrent at only two points, thereby making it possible to have a device that is particularly compact.

In a particular aspect, in order to limit pivoting movements of the control lever 8 about the first axis X, the device includes at least one stroke-limiting abutment. Preferably, the device includes a first pair of abutments for limiting the stroke of the control lever 8 about the first axis X.

In this example, said abutments are arranged between the first plate 4 and the body 1 in such a manner that, in service, the first plate 4 comes to bear against the abutments in order to limit the movement of the control lever about the first axis X. Typically, said abutments are arranged at the connection between the first plate 4 and the body 1. For example, said abutments are carried respectively by the opposite side walls 3a and 3b of the body 1.

Furthermore, in order to limit pivoting movements of the control lever 8 about the second axis Y, the device includes at least one abutment for limiting the stroke of the control lever 8 about the second axis Y. Preferably, the device includes a second pair of abutments for limiting the stroke of the control lever 8 about the second axis Y.

Figure 5:
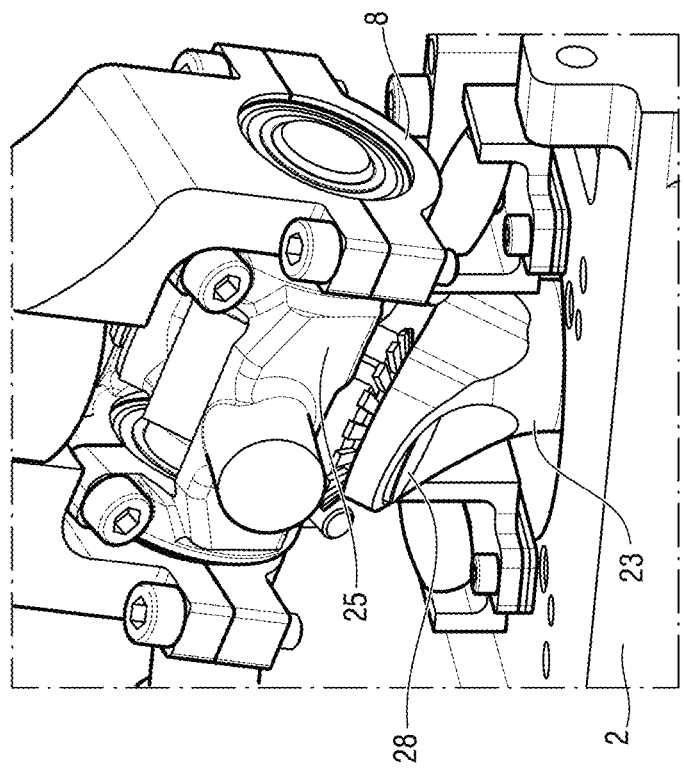
FIG. 5 is a larger-scale perspective view of a portion of the device shown diagrammatically in FIG. 1.

As shown in FIG. 5 and in this example, said abutments 31 are arranged between the control lever 8 and the body 1 in such a manner that, in service, the control lever 8 comes to bear against the abutments 31 in order to limit movement of the control lever about the second axis Y. Typically, said abutments 31 are arranged at the connection between the control lever 8 and the second transmission means. By way of example, each abutment 31 is fastened to the floor 2 of the body 10 so as to extend between the two flanges 26c and 26d of said body 1. By way of example, the surface of each abutment 31 that is to receive the corresponding surface of the control lever 8 is rounded so as to match the shape of the corresponding surface of the control lever 8.

Naturally, the invention is not limited to the embodiment described, and variants may be applied thereto without going beyond the ambit of the invention as defined by the claims.

The term "neutral position" should generally be understood as the position of the control lever in which no force is exerted on the control lever such that if the device is standing on a plane surface, the plane formed by the first axis and the second axis is parallel to said surface. Thus, in the neutral position, the control lever is typically not inclined about either of the second and third axes.

Although in the embodiment described, the bent portion of one of the transmission shaft extends at 25° to the remainder of the corresponding transmission shaft, the bent portion could be shaped with some other angle. In general manner, a particular configuration should be determined for the connection mechanisms and/or for the transmission shafts in order to adapt the angles of inclination of the sixth and eleventh axes.

Although above, the control lever is connected to the second plate by a pivot connection, it is possible to envisage other configurations. For example, the control lever could be connected to the second plate by a straight linear connection, either directly (the two parts then being in contact), or else via other parts.

Naturally, throughout the present application, whenever two parts are movably mounted relative to each other, that may be done directly (the two parts then being in contact) or via other parts.

Either one of the parts connected together by a pivot connection may carry the bearing(s) or any other means needed for providing the pivot connection between the two parts.

The device could include a redundant emergency system that is passive and mechanical for creating the force feedback felt on the control lever. This is made easier by the decoupling and by the symmetry of the forces exerted on the transmission shafts of the device.

Figure 6:
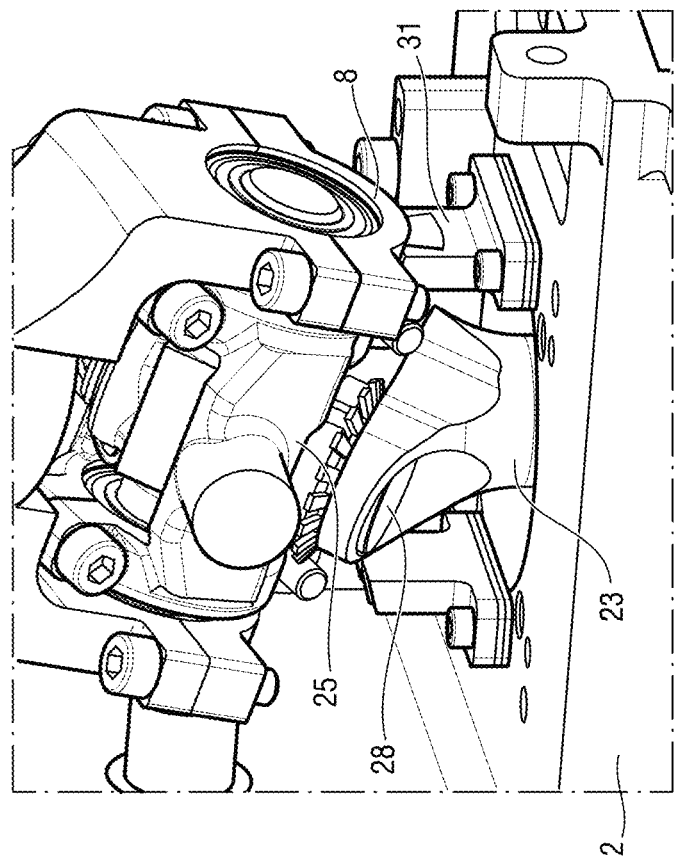
FIG. 6 is a variant of the abutment shown in FIG. 5.

The device could include abutments other than those described. For example, the number and/or the location(s) and/or the shape(s) of the abutment(s) for limiting movement of the control lever about the first axis and/or about the second axis could be modified. Thus, the at least one abutment for limiting movement of the control lever about the first axis could be arranged in such a manner that the abutment(s) come(s) into contact with the control lever or with the second plate and not with the first plate. For example, the at least one abutment for limiting movement of the control lever about the first axis could be arranged on the flanges of the body and/or on the platform. Furthermore, the at least one abutment for limiting movement of the control lever about the second axis could be arranged in such a manner that the abutment(s) come(s) into contact with the platform and not with the control lever. For example, the at least one abutment for limiting movement of the control lever about the first axis could be arranged on the flanges of the body and/or on the platform. Instead of having a surface that is plane or rounded, each abutment (associated with the first axis or with the second axis) could have some other shape, such as the shape of a rotary roller, for example, as shown in FIG. 6. This enables wear of said abutment to be limited.

The invention claimed is:

1. An aircraft flight control device comprising a control lever and a body, the aircraft flight control device comprising:
   a first plate connected to the body by a first pivot connection about a first axis;
   a second plate connected to the first plate by a second pivot connection about a second axis that is substantially perpendicular to the first axis and that intersects the first axis, the control lever being connected to the second plate by a third pivot connection about a third axis that is substantially perpendicular to the first and second axes, and that intersects them;
   a first transmission shaft mounted to pivot relative to the body about a fourth axis and connected to at least one first control motor member outside the body;
   a first connection mechanism connecting the control lever to the first transmission shaft in such a manner that pivoting of the control lever about the first axis causes the first shaft to pivot about the fourth axis, the first shaft and the first connection mechanism being connected to each other by a fifth pivot connection about a fifth pivot axis that is inclined relative to the first axis and to the fourth axis;
   a second transmission shaft mounted to pivot relative to the body about a sixth axis and connected to at least one second control motor member outside the body;
   a second connection mechanism connecting the control lever to the second transmission shaft in such a manner that pivoting of the control lever about the second axis causes the second shaft to pivot about the sixth axis, the second shaft and the second connection mechanism being connected to each other by a seventh pivot connection about a seventh axis that is inclined relative to the second axis and to the sixth axis; and
   a platform connected to the body by an eighth pivot connection about an eighth axis, the second connection mechanism being pivotally mounted on the platform by a ninth pivot connection about the first axis and being pivotally mounted on the control lever by a tenth pivot connection about the first axis.

2. The device according to claim 1 arranged in such a manner that, when the control lever is in a neutral position, the sixth axis is orthogonal to a plane defined by the first axis and the second axis.

3. The device according to claim 1, arranged in such a manner that, when the control lever is in a neutral position, the fourth axis is orthogonal to a plane containing the first axis and the second axis.

4. The device according to claim 1, arranged in such a manner that the first axis, the second axis, the third axis, the sixth axis, the seventh axis, and the eighth axis are substantially concurrent at a first point, and the first axis, the fourth axis, and the fifth axis, are substantially concurrent at a second point.

5. The device according to claim 1, arranged in such a manner that the fourth axis and the sixth axis are substantially parallel.

6. The device according to claim 1, wherein the first connection mechanism is arranged to connect the first shaft to the first plate by a Cardan joint.

7. The device according to claim 1, wherein the second connection mechanism is arranged to connect the second shaft to the control lever by a Cardan joint.

8. The device according to claim 1, wherein the second plate surrounds the first plate externally.

9. The device according to claim 1, wherein both plates surround the platform externally.

10. The device according to claim 1, including at least one abutment for limiting movement of the control lever about the first axis or about the second axis, the abutment being in the form of a rotary roller.

* * * * *